United States Patent [19]

Kantner

[11] 4,249,750
[45] Feb. 10, 1981

[54] FLUID-POWER CONVERTER WITH PAIRED ROTATORS PROVIDING SEALS AND DISPLACEMENT PATHS AND PUMP-MOTOR UTILIZING SAME

[76] Inventor: Harold H. Kantner, 1112 Hinman Ave., Evanston, Ill. 60202

[21] Appl. No.: 13,844

[22] Filed: Feb. 22, 1979

[51] Int. Cl.³ .................. B62M 1/06; F01C 1/08; F01C 1/10
[52] U.S. Cl. .................. 280/216; 418/61 R; 418/165
[58] Field of Search .............. 280/216; 418/4, 58, 418/61 R, 165

[56] References Cited

U.S. PATENT DOCUMENTS

| | | | |
|---|---|---|---|
| 485,094 | 10/1892 | Dey et al. | 280/216 |
| 614,992 | 11/1898 | Schmidt | 280/253 |
| 2,311,237 | 2/1943 | Loveday | 418/165 |
| 2,745,355 | 5/1956 | Mosbacher | 418/165 |
| 3,151,526 | 10/1964 | Van Hoene | 418/165 |
| 3,606,600 | 9/1971 | Pollman | 418/61 R |
| 3,653,791 | 4/1972 | McCoy | 418/153 |

FOREIGN PATENT DOCUMENTS

| | | | |
|---|---|---|---|
| 850405 | 7/1949 | Fed. Rep. of Germany | 280/216 |
| 1158638 | 7/1969 | United Kingdom | 418/61 R |

*Primary Examiner*—John J. Love
*Assistant Examiner*—Donn McGiehan
*Attorney, Agent, or Firm*—Francis J. Bouda

[57] ABSTRACT

The fluid-power converter of the present invention is a pump-motor having matched rollers and matched gears arranged to provide seals and displacement paths. The pump-motor includes a plurality of rotators in series-contact to define a plurality of fluid-pressure zones. At least one of the rotators has a smooth surface and at least another of the rotators has a gear-like surface. A smooth rotator and a gear-like rotator are in contact with each other to define therebetween a displacement path whereby fluid is transferred from one zone to another zone, and at least one pair of similar rotators are in contact with each other to provide therebetween (and between the pressure zones) a seal to insure fluid-flow in only one direction between the zones at a given moment. A pair of the converters, one operating as a pump and the other as a motor, provide the motive power with free-wheeling and coaster-brake features for small vehicles such as bicycles, wheelchairs, and golf carts.

20 Claims, 26 Drawing Figures

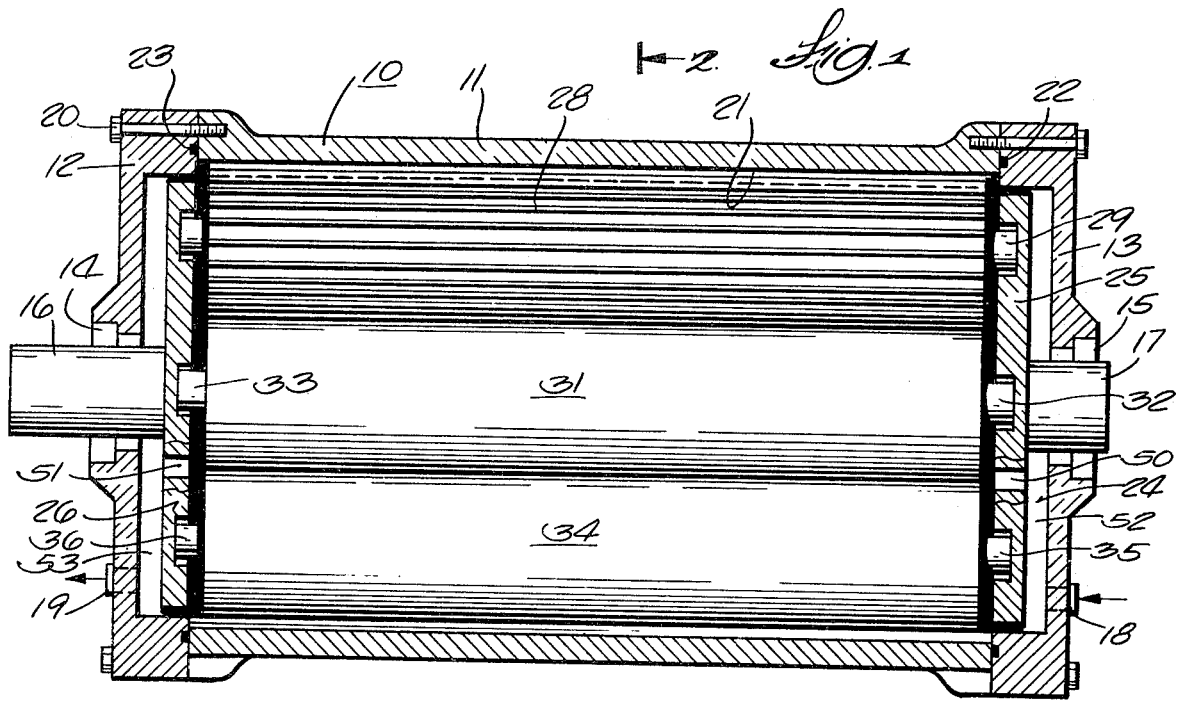
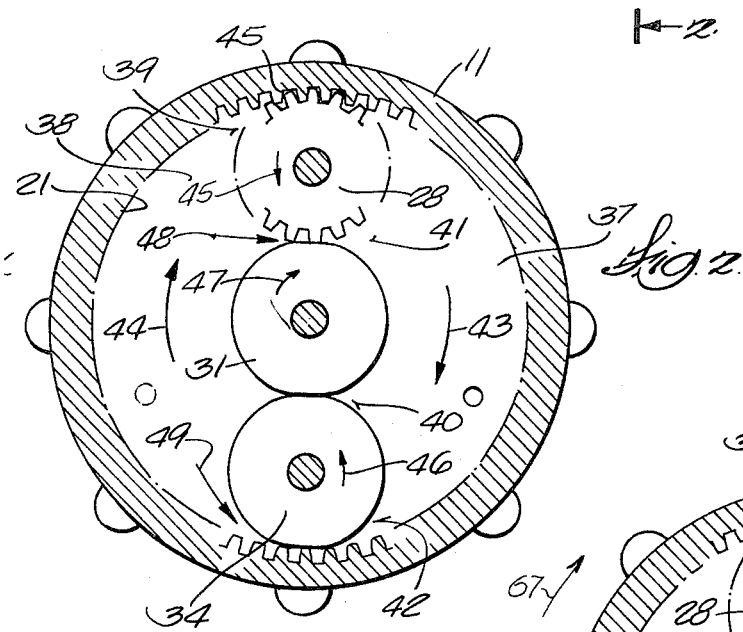
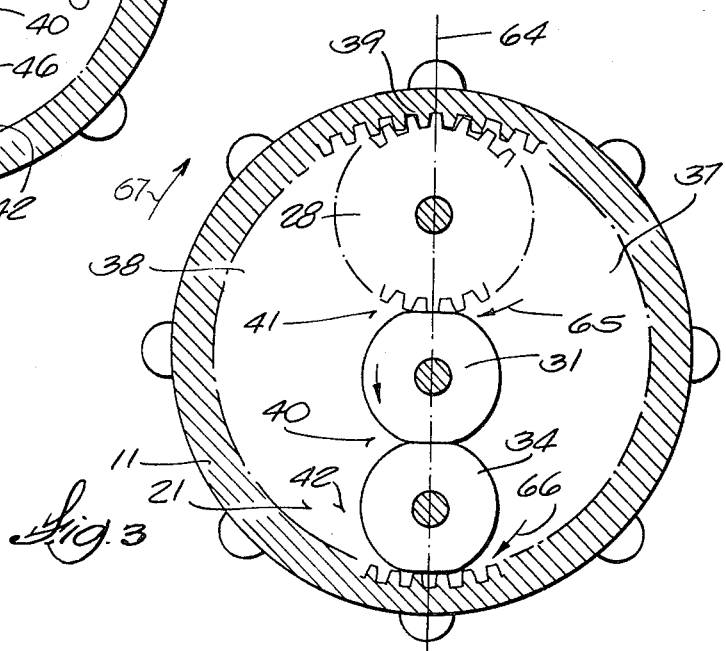

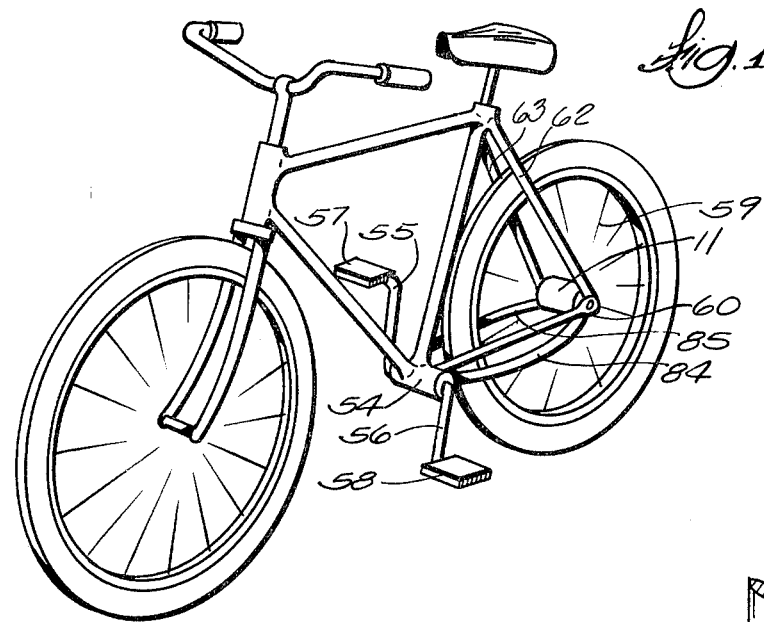
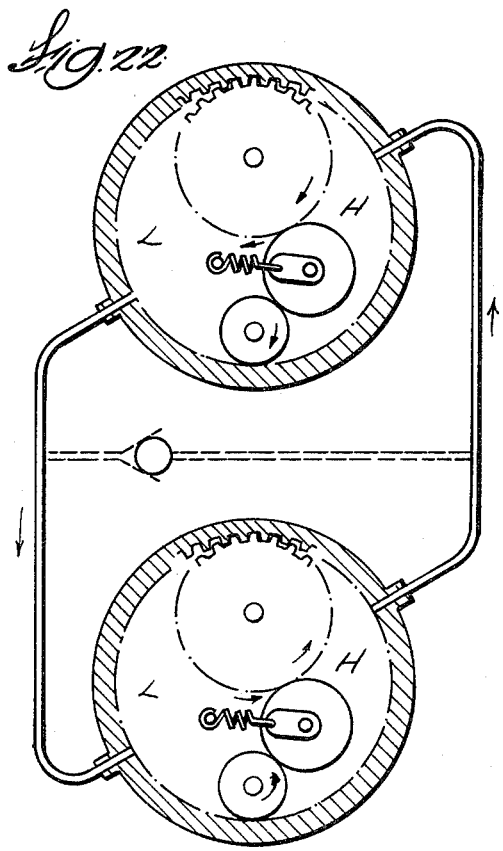
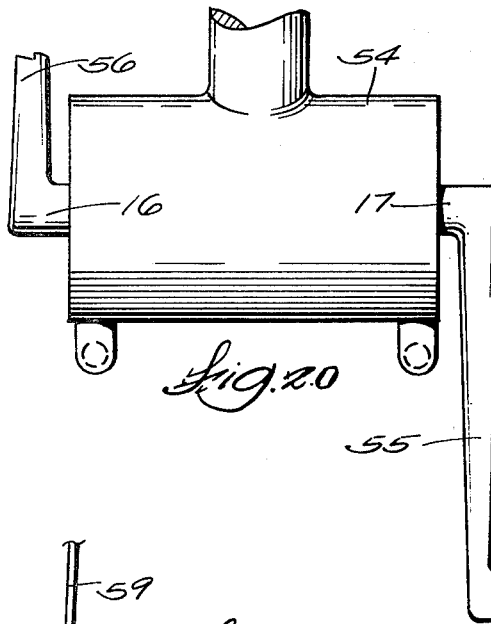
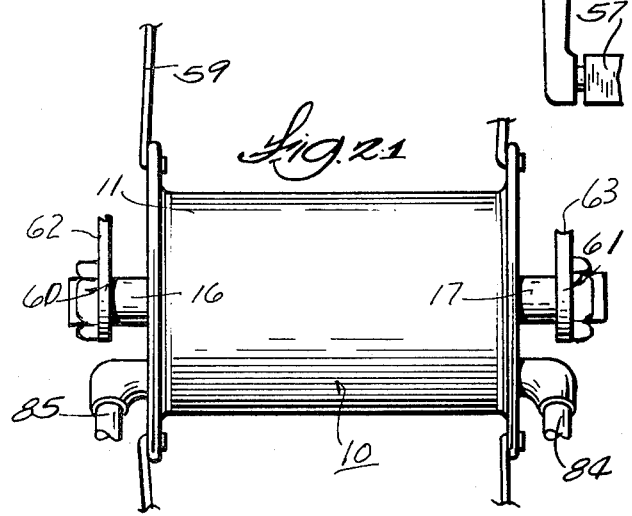

FLUID-POWER CONVERTER WITH PAIRED ROTATORS PROVIDING SEALS AND DISPLACEMENT PATHS AND PUMP-MOTOR UTILIZING SAME

BACKGROUND OF THE INVENTION

Fluid power converters have been known for many years and separate classifications in the Patent Office have been developed to accommodate the various types of fluid power converters.

However, for applications in the low and medium pressure range (up to 1500 psi), gear pumps and motors are the most common types. All but a few are designed to operate above 500 rpm. To drive a 24" diameter wheel at 5 mph requires a rotation of 70 rpm. A hub motor without gear box intended for low angular rates is an expensive device. Unless high precision and special care are used in manufacture, even internal gear motors of the "gerotor" type will not run without "gallop" below minimal effective speeds of 150 rpm.

There is available on the market a small hydraulic motor designed to run at low speeds (down to 0 rpm) with high torque. It is similar to other torque motors well known in the art, and its construction is complex and costly. The elements are machined with extremely close tolerances, and are precision matched. Nevertheless, some power is lost in "slippage."

"Slippage" is the undesirable passage of fluid between input and output areas in the clearance spaces between the housing and the shaft-coupled members. Clearance and fluid viscosity are the most important factors to control "slippage." Closure of clearance spaces by seals created by rotators in rolling contact is accomplished in this invention. The benefit of such seals is compounded by reduction of tolerance demands when they are made resilient (see U.S. Pat. No. 3,653,791). Relatively coarse tolerances facilitate mass production of motor elements when their configuration favors inexpensive fabrication, as by casting, extrusion, or injection molding.

In the following description, the term "rolling seal" is sometimes used. This does not mean that the seal rolls but it is to be understood as meaning a fluid-seal created at the line of contact between a pair of adjacent rotators of similar configuration. This structure is contrasted to a seal created between a stationary surface and a second moving surface wiping along the first surface, as shown in prior art.

It is created between mated pairs of rotators of similar surface characteristics (see FIG. 2 at 39 and 40).

It is distinguished from a displacement path which is created between unmatched pairs of rotators of dissimilar surface characteristics (see FIG. 2 at 48 and 49).

DESCRIPTION OF THE INVENTION

In my invention, I employ the concept of fluid-power devices, either hydraulic or gas, utilizing elements with rolling seals and displacement paths which separate inlet and outlet zones (i.e., zones of different pressure) as will be hereinafter more fully described. Though I describe this invention as particularly applicable for small pump-motors, it is applicable to large fluid-power converters as well.

It is important to note that the primary components of the present invention are elements easily and inexpensively fabricated. In one embodiment, they consist of an internal gear with end caps and shafts, a pinion, a pair of rollers, and a spider-disc cage. The power shafts, concentric with and fixed to the cage ends, are cradled in radial-thrust bearings in the end caps. Shaft seals, face seals, perimeter dynamic seals and static seals are arranged to prevent leakage and to minimize slippage between input and output zones. It is an important aspect of low cost manufacture that the bearings, seals and centerlessground shafts are readily available as inexpensive commercial items. Rollers are well known in the art and may be either compressible or relatively rigid. In one embodiment, the surface may be compressible elastomer (which will be under compression against gear teeth) to create and seal a displacement path of slightly warped pockets during transit of fluid from one zone to the other. In another embodiment the roller may be non-compressible (e.g. of metal) and suitable for high-temperature operation, such as in a continuous combustion rotary engine such as a jet engine. The gears may be unusual in those instances where substantial displacement is required, as in such cases they will have face width large in dimension relative to pitch diameter.

The device of the present invention is operated by movement of fluid from one zone to the other via intertooth spaces creating displacement paths where the gears are in contact with the adjacent rollers, as relative rotation occurs between the housing and the spider-disc cage with the pinion and rollers carried thereby. Of great importance is the use of rolling seals and the fact that all displacement paths deliver fluid in the same direction with respect to the pair of chambers, or pressure zones.

It is to be noted that the device of the present invention can operate either as a pump or a motor. When the housing and shaft are relatively rotated (either the housing stationary and the shaft rotated or the shaft stationary and the housing rotated), fluid is forced from one area to the other, providing the function of a pump. When fluid is forced into one of the zones, relative rotational motion is created between the housing and the shaft and the device operates as a motor.

It is also apparent that the power shaft can be bored to provide fluid paths for coupling hydraulic input-output lines through a fixed shaft. In that case the housing would be the rotary member. It may be perceived as the hub of a wheel mounted in a double support such as the fork of a bicycle.

The fixed-shaft-and-rotary-housing version of the fluid power device of the present invention is particularly adaptable as a power hub in wheels of small vehicles such as wheelchairs. When the hub is rotated by hydraulic effort, the device serves as a motor. When it is rotated by mechanical effort, the device becomes a pump. Different fluid power converters completing the same hydraulic circuit can be arranged in various pump and motor combinations to effect the full cycle of mechanical-hydraulic-mechanical conversion.

When placed in wheels, the hub motors become wheel motors. Motive horsepower input is proportional to the product of flow and pressure, and tractive horsepower output is proportional to the product of wheel motor torque and rotational rate. Over a range of useful motor efficiencies the vehicle speed can be controlled by fluid-flow, and the acceleration of the vehicle controlled by fluid-pressure.

In the present invention, nominal hydraulic power parameters were calculated for driving a model vehicle over level surfaces at five mph. With 24" diameter wheels, hub motors of 73% efficiency were assumed. A pair operating at 2.5 gallons per minute at 250 psi represents fluid power at the level of 0.36 HP. Required displacement characteristics of each motor, when used in a divided flow parallel hydraulic circuit at 250 psi, would be about 1.3 gallons per minute. At zero pressure, the free flow pump delivery per circuit would be approximately 1.35 gallons per minute. Design choices of displacement and operating pressure determine the power conversion capabilities of each device.

In the present specification, reference is sometimes made to a pump which provides hydraulic motive power. This pump need not be of the same species as the hydraulic motor which converts it to mechanical tractive power in a transportation application. As in any mechanical-hydraulic-mechanical cycle or chain, either a pump or a motor or both may be a pump-motor of the present invention. Furthermore, mechanical input to a hydraulic pump of the power chain may be derived from a variety of prime movers acting independently, alternatively, or in concert. For example, the pump of a fluid drive bicycle, moped, wheelchair, or other mobility system could be driven by an engine (electric, gasoline, or other) coupled to supplement or supplant hand or foot action of an operator.

Similarly, mechanical output from an hydraulic motor of the power chain may be applied to a variety of devices such as electric generators, fuel-injection pumps, supercharger turbines, conveyor belts, and exercise treadmills.

In the present specification, reference is sometimes made to smooth rotators or to rotators having a smooth surface, and in other instances to rotators having gear-like surfaces. When I refer to a smooth rotator or to a rotator with a smooth undulating surface, I mean only to distinguish over a surface having pockets, recesses, or fluid-receptacles therein, and do not mean to identify the absolute smoothness of the surface. Similarly, gear-like surfaces may include trochoidal surfaces or tread-like surfaces, all of which may produce pockets when the rotator is operated against a non-pocketed surface or against a different gear-like rotator having teeth of lesser amplitude. Quite obviously a gear-like rotator may have "polished" teeth to provide "smooth" surfaces on the teeth, but the rotator itself is pocketed and, therefore, not to be considered as a smooth surface. Likewise, the smooth rotator may have a rubber-like or a elastomer-like surface which is compressible, but the rotator itself is relatively "smooth" and non-pocketed. A smooth rotator, in one embodiment, may be metallic and non-compressible.

Where a smooth rotator revolves in contact with another smooth rotator, a rolling seal is provided. Similarly where a toothed rotator rotates in contact with another similar toothed rotator, a rolling seal is also provided. However, where a smooth rotator rotates in contact with a toothed rotator, or where toothed rotators of dissimilar characteristics are in rolling contact, a plurality of movable, fluid-transferring pockets are formed to provide a fluid-displacement path.

The following definitions will aid in understanding the specification:

"Matched pair" means a pair of rotators having the same surface characteristics.

"Alternate pairs" identifies a pair of rotators of similar surface characteristics followed by a pair of rotators of the other surface characteristics.

"Mixed pair" indicates two rotators of different surface characteristics.

One pair of rotators cannot create a pair of pressure zones.

Alternate matched pairs (i.e. more than three rotators) must be used to insure flow in only one direction.

Three rotators cannot operate in series-contact because the interfaces between the first and last rotators will be moving in opposite directions.

In a pair of rotators (either inner or outer, and either smooth or geared), if one is an internal member and is geared, then alternate pairs create surface speed problems which require the use of resilient smooth rotators. If the internal surface is smooth, then alternate pairs operate satisfactorily without surface speed problems, even if the smooth pair is now resilient.

Any uneven number (more than 3) of matched pairs operate without surface speed problems, whether in an internal or an external system.

Any multiple consecutive number of similarly matched pairs operate as a single pair, and any adjacent chambers operate as a single chamber.

The housing need not be cylindrical but can be formed by a moving belt-like surface.

Both fluid zones do not have to be closed; i.e., one of the zones may be open to the atmosphere or to atmospheric pressure.

The present invention depends on the relation of rotating gears and rollers, in contact with each other, to provide rolling seals and movable displacement paths.

Rolling contact of properly meshed gears of equal pitch occurs at their pitch radii. Whatever the ratio of those radii of the gears, the circumferential speeds at the pitch circles of each must be identical. An internal gear can be meshed only with an external pinion. Tooth tips lie inside the pitch circle of an internal gear but outside that of an external gear. Thus, tips of the teeth of the internal gear move at lower peripheral speeds than those of the meshed pinion. Accordingly, elastomeric rollers of adequate diameter lightly engaged with tooth tips of the respective gears (but not touching each other) would rotate with surface speeds substantially equal to those different peripheral speeds of the teeth. Increased speed of the free surface of that roller in contact with the relatively slow teeth of the internal gear can be achieved by increase of its compression against the gear face. Thus the differential surface speeds of the two rollers can be reduced as they are dimensioned to form a line of contact marking a rolling seal between the two chambers. With careful disposition and proportioning of compressions the surface speeds of the two rollers can be made substantially equal along a non-sliding band of osculating elements. Due to inaccuracies or coarse tolerances, mild sliding action might intrude at rolling seals. Such action is more likely to occur where the smooth roller surfaces contact each other than where they are compressed against their respective gears.

The pitch and relative sizes of internal gear and pinion determine differential surface speed of the rollers in the first instance. By analytical formulation, it can be demonstrated that the differential peripheral speed, $\Delta S_{int}$, of tips of the teeth of an internal gear and its meshed pinion is proportional to the angular velocity, $\omega$, of the internal gear according to the equation $\Delta S_{int} = (1/P)(1 + R/r)\omega$. In that equation, the term $R/r$ represents the ratio of pitch radii of internal gear to pinion. It must, of course, be greater than 1. The reciprocal of diametral pitch, P, is called the addendum. It expresses the offset of a gear's tooth tips from its pitch radius. The formulation shows that fine pitch gears and those where the pinion is not many times smaller than the internal gear are favored for ease of surface speed compensation.

Although the tips of teeth of an internal gear and its pinion cannot move at the same circumferential velocity during properly meshed rotation, the situation is otherwise for a mesh where both are external gears. In that case, the difference of circumferential speeds, $\Delta S_{ext}$ of the tooth tips is proportional to the angular velocity, $\omega$, of the larger gear according to the equation $\Delta S_{ext} = (1/P)(1-R/r)\omega$, where the symbols on the right represent the same parameters as before. Thus, the differential peripheral speed of tips of the teeth of the meshed external gears becomes zero when their pitch radii are made equal. True rolling contact thus is possible between gears and rollers which partition the interior space of a body with smooth cylindrical interior walls while facilitating fluid transfer from one chamber to the other via intertooth pockets.

An object of the present invention is to provide a fluid power converter with a plurality of rotators, said rotators combined in matched pairs to provide high pressure and low pressure zones with a plurality of fluid displacement paths between rotators of different surface characteristics, and with a plurality of rolling fluid seals between rotators of the same surface characteristics.

Another object of the present invention is to provide a motor-pump of extremely low horsepower and extremely low fluid-flow characteristics.

Another object of the present invention is to provide an hydraulic motor-pump with an odd number of rotary elements within a planetary gear housing, utilizing rolling seals to separate input and output fluid zones in the housing.

Another object of the present invention is to provide a low horsepower, low volume, fluid pump-motor which can be manufactured very inexpensively.

Another object of the present invention is to provide a pump-motor system for small vehicles such as bicycles and wheelchairs, which system includes "free-wheeling" and "coaster brakes."

Another object of the present invention is to provide a fluid pump-motor utilizing rolling seals and resilient rotators in a planetary gear and roller system.

Another object of the present invention is to provide a two-gear planetary pump-motor with internal rotators, fluid flowing from one area to the other via separate displacement paths.

With the above and other objects in view, more information and a better understanding of the present invention may be obtained by reference to the following detailed description.

DETAILED DESCRIPTION

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

FIG. 1 represents a longitudinal cross-sectional view of one embodiment of the pump-motor of the present invention.

FIG. 2 represents a transverse cross-sectional view taken generally along line 2—2 of FIG. 1.

FIG. 3 is a view, similar to FIG. 2, illustrating a rotational housing and a non-rotational shaft and with a relatively larger pinion and relatively smaller smooth rotators.

FIG. 19 represents a perspective view of a bicycle utilizing a pair of pump-motors of the present invention.

FIG. 20 is an elevational view of a pump-motor of the present invention mounted in the crank-portion of a bicycle.

FIG. 21 is an elevational view of the pump-motor of the present invention mounted in the rear wheel-hub of a bicycle.

FIG. 22 is a diagramatic sketch illustrating how a pair of pump-motors of the embodiments illustrated in FIGS. 7 and 9 can be arranged to provide a drive system for a bicycle with forward propulsion and free-wheeling.

Figure 4:
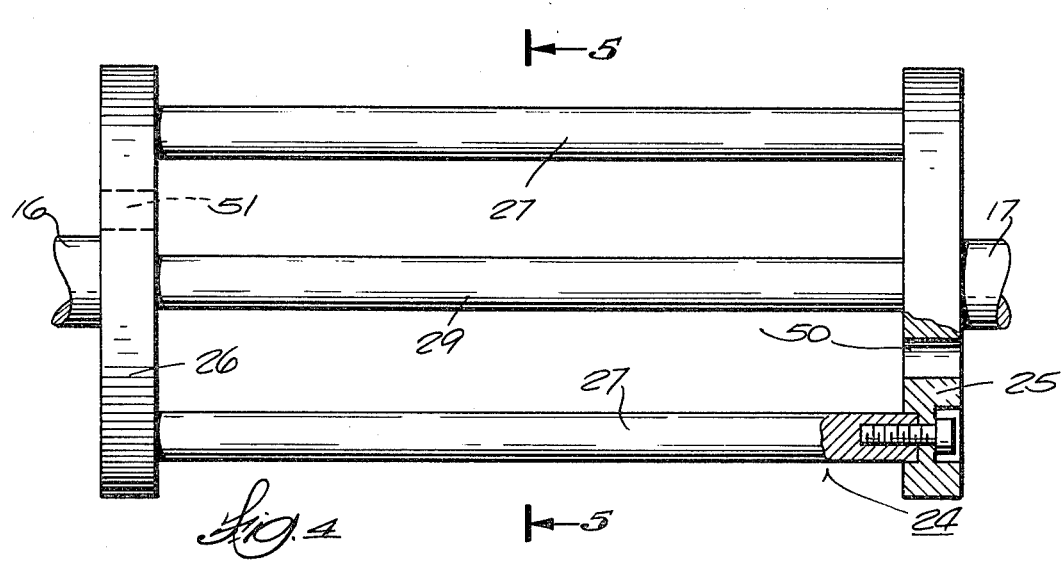
FIG. 4 is an elevational view of the spider-disc cage assembly with the pinion and rotators removed.
Figure 5:
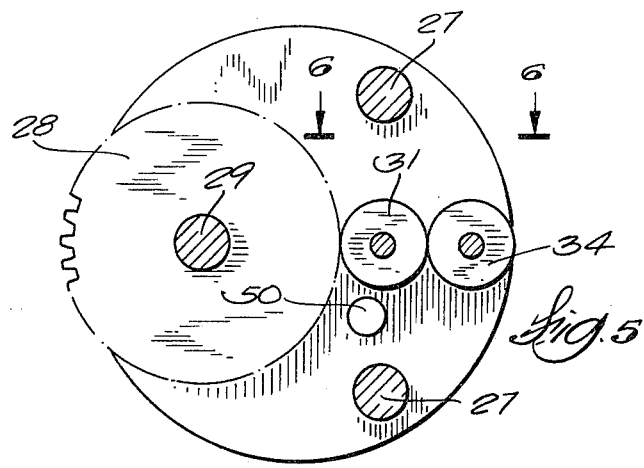
FIG. 5 is a cross-sectional view taken generally along line 5—5 of FIG. 4 illustrating the location of the pinion, rotators, and spacing rods in the spider-disc cage.

With reference to FIGS. 1 and 2, I illustrate one embodiment of the present invention, which though not the preferred embodiment, easily illustrates the basic principle of the invention. In this embodiment of FIGS. 1 and 2, the pump-motor includes a housing 10 having a cylindrical body 11 and a pair of end caps 12 and 13. The end caps 12 and 13 have central bores 14 and 15, respectively, through which the power shafts 16 and 17 extend. Appropriate fluid-tight seals (described in greater detail hereinafter) are disposed in the bores 14 and 15 to create fluid-tight joints between the end cap 12 and the shaft 16, and between the end cap 13 and the shaft 17.

An inlet hole or port 18 is bored in one of the end caps, as, for instance, the end cap 13, and an outlet port 19 is bored in the other end cap, as, for instance, end cap 12. Thus an appropriate fluid material can be brought to the interior of the pump-motor through the inlet 18 and can be discharged through the outlet 19.

End caps 12 and 13 may be suitably fixed to the cylindrical body 11 by the bolts 20 so as to provide the unitary housing 10, (with appropriate static seals such as "O" rings) creating fluid-tight joints between end caps and body, as at 22 and 23.

The inner surface of the body 11 is an internal gear 21 extending over the length of the inner face as is shown particularly in FIG. 1.

Within the body 11 is a spider-disc cage 24, formed by a pair of end plates 25 and 26 held together by the spacer rods or dowels 27. This spider-disc cage is shown particularly in FIG. 4.

One of the end plates, such as end plate 25, is securely fastened to a power shaft such as the power shaft 17, and the other end plate 26 is securely fastened to the opposite power shaft 16. The spacer rods or dowels 27 are securely fastened to the end plates, as by screws, to provide a rigid cage constructed to rotate freely within the body 11.

Also supported within the spider-disc cage 24 is the pinion 28 and a pair of rollers 31 and 34. The pinion is supported for rotation on one of the spacer rods or dowels, as, for example, the rod 29, and this rod acts as a shaft or support for the rotating pinion.

Figure 6:
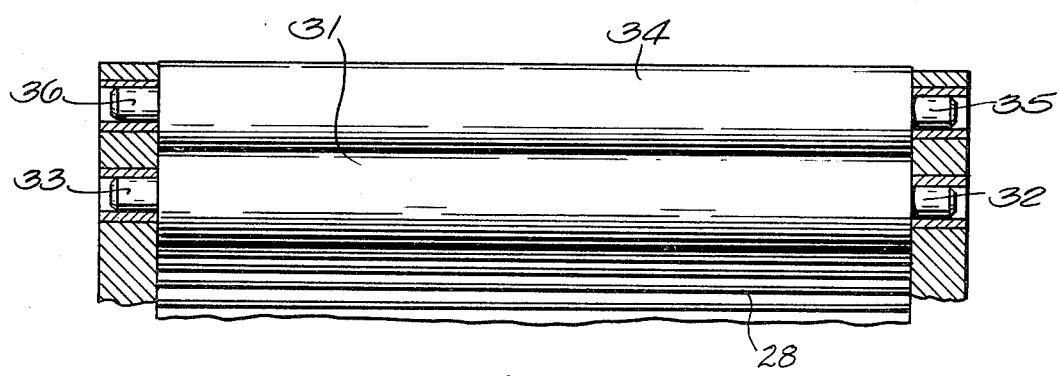
FIG. 6 is a fragmentary cross-sectional view taken generally along line 6—6 of FIG. 5, illustrating the assembly of the resilient rotators in the spider-disc cage end plates.

The rollers 31 and 34 are mounted on shafts which are supported in the end plates 25 and 26. For instancce, the roller 31 has the shaft ends 32 and 33 shown in FIG. 6 and roller 34 has the shaft ends 35 and 36 for support and to permit rotary motion.

The pinion may be made of a plastic material such as nylon, and the bore thereof is smooth and it rotates freely on the ground and polished surface of the rod 29 which provides a bearing surface between rod 29 and the pinion or its bearings, if any. Additionally, the inner faces of the end plates 25 and 26 are polished and provide bearing surfaces against which the ends of the pinion 28 and the rollers 31 and 34 bear so as to provide a fluid-tight seal between the rollers, the pinion and the respective end plates 25 and 26.

As has been stated, it has been found desirable to make the rollers out of an elastomeric material, and the pinion out of a plastic material, and such materials create an effective seal with the end plates 25 and 26. However, it is to be understood that a separate sealing member may be placed at the ends of the rollers and pinion to provide a fluid-tight seal.

The pinion 28 and the rollers 31 and 34 are dimensioned appropriately to provide a pair of fluid-tight zones or chambers 37 and 38 within the housing 10 by creating a "barrier" as is seen particularly in FIG. 2.

For the purposes of simplicity, I have shown in FIG. 2 the pinion 28 and the rollers 31 and 34 to be of substantially the same outer diameter. Such construction is operable and within the scope of the invention, but the relative peripheral speeds of internal gear, pinion, and the two rollers, create some "slipping" at the surface contact between rollers and between rollers and gears as it also does in the embodiment illustrated in FIG. 3 where the diameter of the pinion 28 is substantially larger than the diameter of the rollers 31 and 34. In the embodiments shown in FIG. 2 and in FIG. 3, the peripheral speed at line of contact between pitch circles of pinion 28 and inner gear 21 lies between those of the tooth tips of the respective gears. Nevertheless, the rollers engaged with each gear can be compressed in such a way as to equalize the surface speeds at their elements of mutual contact.

The pinion 28 provides a fluid-tight seal or mesh with the internal gear 21 at the junction 39, and the rollers 31 and 34 provide a fluid-tight seal at the interface 40.

The interface 41 between the pinion 28 and the roller 31 provides a fluid transfer or displacement path between the chambers 37 and 38, and the interface 42 between the internal gear 21 and the roller 34 provides a second fluid transfer or displacement path for fluid between the chambers 37 and 38.

The resilient roller 31 is in fluid-tight contact with the tips of the teeth of the pinion 28 but the spaces between the teeth provide a series of "pockets" for transferring fluid from one chamber to the other.

Similarly, the surface of the resilient roller 34 is in fluid-tight contact with the tips of the teeth of the internal gear 21 at the interface 42, and the spaces between the teeth of the internal gear 21 also provide "pockets" for transferring fluid between the chambers 37 and 38.

Thus I have described a planetary gear-and-roller system including the internal gear 21 in the cylinder 11, and the rotatable members, including the pinion 28 and the two resilient smooth-faced rollers 31 and 34.

In FIG. 2, I have illustrated with arrows the relative movement of the gears and rollers when the housing 10 is fixed in a non-rotatable position and the shafts 16 and 17 (with the attached spider-disc cage 24) and the pinion 28 and the rollers 31 and 34 are free to rotate.

Thus, looking at FIG. 2, when the shafts 16 and 17 rotate in a clockwise direction, the cage 24 also rotates in clockwise direction as indicated by the arrows 43 and 44. This also causes the pinion and rollers to rotate, but since the pinion 28 is meshed with the internal gear 21, the pinion 28 rotates in a counter-clockwise direction about its axis as indicated by the arrow 45. At the same time, the roller 34 rotates about its axis in a counter-clockwise direction as indicated by the arrow 46, and the roller 31 rotates in a clockwise direction about its axis as indicated by the arrow 47.

When such motion takes place, fluid contained within the chamber 38 will pass through the interface 41 in the direction of the arrow 48 and through the interface 42 in the direction of the arrow 49.

It should be noted in FIGS. 1 and 2 that I have provided a pair of apertures or ports, as, for instance, the port 50 in plate 25, and the port 51 in the plate 26. These ports permit the hydraulic fluid to flow in and out of the chambers 37 and 38 and into the spaces 52 and 53 between the end caps 12-13, and the rotary end plates 25-26.

If the shafts 16 and 17 are rotated in a counter-clockwise direction as viewed in FIG. 2, the rotations will be reversed, and the fluid will flow from chamber 37 to the chamber 38.

The description of the pump-motor of the present invention previously described is appropriate for an installation where the housing 10 may be secured to a non-rotatable portion of a vehicle, such as a bicycle, as is shown particularly in FIGS. 19 and 20. The housing 10 may be supported in an appropriate bracket 54 so that it is non-rotatable with respect to the frame of the bicycle. The shafts 16 and 17 may be extended to fasten to the arms 55 and 56 of cranks having pedals 57 and 58 attached thereto. Under the circumstances, when the operator of the bicycle cranks the pedals 57 and 58, the shafts 16 and 17 will rotate and provide the fluid-pumping action previously described.

Conversely, I may arrange the pump-motor of the present invention so that the shafts 16 and 17 are non-rotatable, as is shown particularly in FIGS. 19 and 21 where the pump-motor of the present invention is mounted in the rear wheel of the bicycle. In this instance, the spokes 59 of the bicycle wheel are fastened to the housing 10, while the shafts 16 and 17 are non-rotatably secured, as at 60 and 61, in the rear fork 62 and 63 of the bicycle. In this instance, the ports 18 and 19 in end caps 12 and 13 may be plugged or eliminated, and the shafts 16 and 17 may be bored to provide fluid conduits to conduct the fluid to and from the spaces 53 and 52. When fluid is forced through the cage via the space 52 and port 50 and the space 53 and port 51, the housing 10 will be caused to rotate about the shafts 16 and 17, turning the hub and hence the bicycle wheel.

I have illustrated in FIG. 3 the directional movement of the respective elements of the pump-motor of the present invention under circumstances referred to in the bicycle-wheel assembly shown in FIG. 21. In this case, the cage 24 and the pinion 28 and rollers 31 and 34 do not revolve as a unit but stay in a fixed position relative to the centerline 64. However, when fluid is forced into the chamber 37, it passes through the displacement path 41 in the direction of the arrow 65 and through the displacement path 42 in the direction of the arrow 66. This causes the cylinder 11 with the internal gear teeth 21 to rotate clockwise in the direction of the arrow 67.

Figure 18:
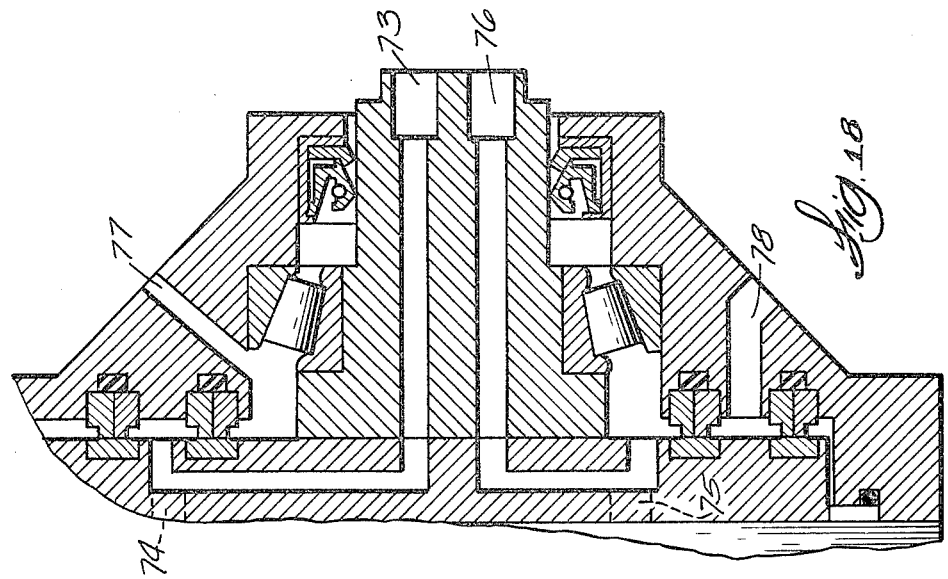
FIG. 18 is a fragmentary cross-sectional view of still another alternative form of end cap and shaft assembly illustrating the arrangement for both fluid inlet and fluid outlet through one shaft.
Figure 17:
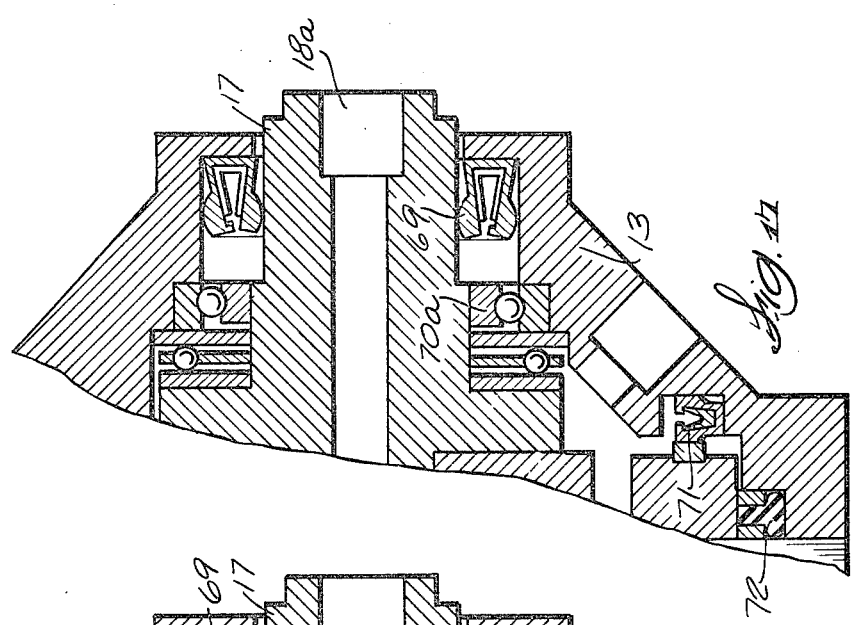
FIG. 17 is a fragmentary cross-sectional view in another form of end cap and shaft assembly.
Figure 16:
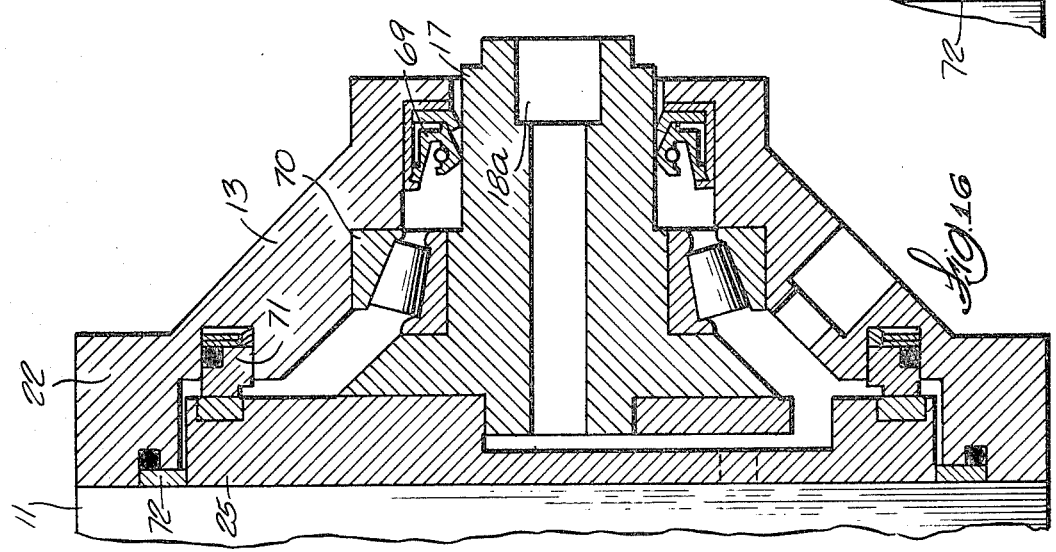
FIG. 16 is a fragmentary cross-sectional view of a modified form of end cap and shaft illustrating fluid-tight seals between these members.

Referring now to FIGS. 16, 17 and 18, I have illustrated alternative forms of construction of an end cap and power shaft so as to provide the fluid-tight seal necessary between the shaft and the end-cap of the housing, as well as to provide the fluid space between the inner surface of the end-cap and the outer-face of the end plate of the cage. These FIGS. 16, 17 and 18 also illustrate the utilization of combined radial and thrust bearings to provide appropriate support for the cage structure with the relatively high end-to-end fluid pressure difference which exists within the housing when input/output transfer is coupled via fluid spaees at each end of the pump-motor.

Referring particularly to FIG. 16, I draw attention to the high-pressure shaft seal 69, the radial thrust bearing 70, the face seal 71, and the perimeter dynamic seal 72. The perimeter dynamic seal 72 may serve not only to create a dynamic seal between the end plates 25/26 of the cage 24, and the perimeters 22 and 23 of the end caps, but they also serve the additional purpose of creating an appropriate static seal between the end caps and the body 11.

In FIG. 17, I have shown alternate forms of providing perimeter dynamic seals 72, and of providing high-pressure shaft and face seals 69 and 71 between the cage ends and the housing end caps. In this instance, the radial thrust bearings are of the ball type, rather than the roller-bearing type. The relative positions of shaft seals and bearings may be interchanged for those situations where it is desirable to keep the bearings and their lubricant, if any, in external environment.

In FIG. 18, I illustrate how a shaft or end cap can be bored with both inlet and outlet ports so that the fluid-flow will take place at one end of the shaft. This construction provides for single-ended shafting and coupling of the fluid transfer fittings on only one end of the pump-motor. Thus the other end is left free for a flange or base-plate mounting, or to provide mounting of two of the units in a back-to-back arrangement. This back-to-back assembly permits the use of a common shaft but with a different mechanical advantage in the two-separate pump-motors.

In FIG. 18, I refer particularly to the inlet port 73 which introduces the fluid through the orifice 74 to one of the chambers in the pump-motor. The transferred fluid can then be removed through orifice 75 and discharged through the outlet port 76. The alternative construction shown in FIG. 18 also provides for an inlet port 77 and outlet port 78 constructed in the end-cap for those installations where the housing is non-rotary and the shaft is rotary. It is evident from the foregoing that when the ports 73 and 76 are utilized, the ports 77 and 78 are sealed off. Conversely, when the ports 77 and 78 are operative, the ports 73 and 76 are sealed off.

Figure 7:
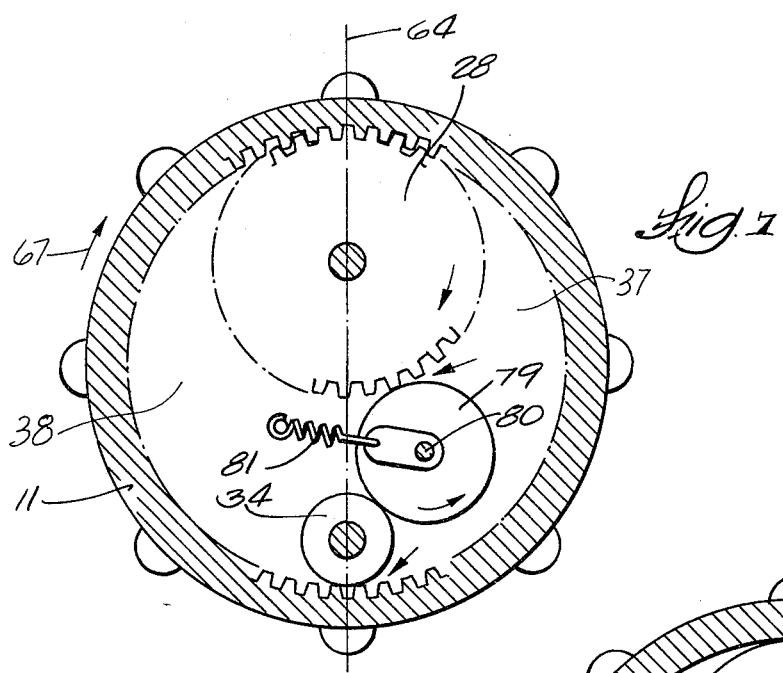
FIG. 7 is a view similar to FIGS. 2 and 3, illustrating another embodiment of the present invention wherein the intermediate resilient rotator operates as a pressure release valve, as well as the intermediate rotator between the pinion and the other resilient rotator.

Referring now to FIG. 7, I have illustrated an alternative form of the construction wherein an intermediate roller 79 is supported within the cage on a floating shaft 80 which is urged by a spring 81 so as to bring the roller 79 into tight contact with the pinion 28 and the other roller 34.

In this configuration of pump-motor design, the pressure differential beyond a spring-set limit may be developed in one direction only. The rotational and fluid-flow directions (and relative pressure designations) are shown for the operation of the unit as a motor. That is, fluid forced in to the chamber 37 causes the cylinder 11 to rotate in the direction of the arrow 67.

Reversal of the pressure differential (i.e., when fluid is forced into the chamber 38) fails to rotate the motor in the opposite direction when the pressure overcomes the spring force to release the fluid from the chamber 38 to the chamber 37 by "valve action" through the interfaces 40 and 41. Thus the spring loaded idler roller operates as a self-contained check-valve when positioned off the axis 64, and with the relatively larger diameter as illustrated in FIG. 7.

It is noteworthy that the same function will take place when the device serves as a pump instead of as a motor. For example, driving the cylinder 11 in the direction opposite to that shown by the arrow 67 in FIG. 7, causes the pinion and the rollers to rotate in the directions opposite to that previously discussed. Therefore, fluid is displaced through the displacement paths 41 and 42 from the low pressure chamber 38 to the high pressure chamber 37. Direct passage via interfaces 40 and 41 without any pumping action results from reversal of the pressure differential when the direction of pump drive is reversed.

Thus, the built-in valve action illustrated in FIG. 7 causes the pump-motor to exhibit uni-directional operation with a flow via the displacement paths 41 and 42 from chamber 38 to chamber 37 as a pump and from chamber 37 to chamber 38 as a motor. Rotary work performed by fluid displacement from high to low pressure chambers characterizes motor action. Rotary work applied to displace fluid from low to high pressure chambers characterizes pump action. A pump and motor circuit is shown in FIG. 22.

Referring now to FIGS. 22, 23, 24 and 25, I have illustrated how the pump-motor of the present invention can be used in a multi-speed bicycle transmission system with hydraulic coaster brake.

Figure 23:
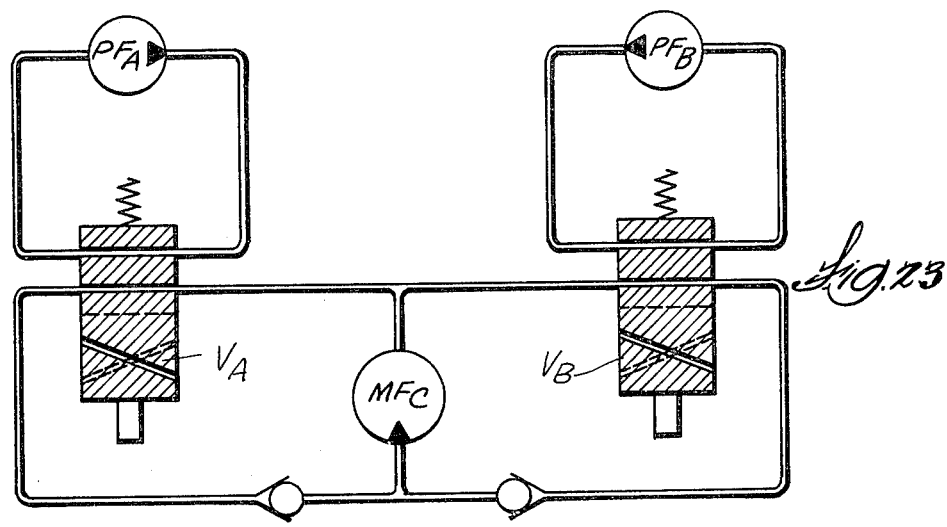
FIG. 23 is a schematic diagram illustrating an arrangement utilizing a pair of pump-motors having different displacements.

FIG. 23 shows schematically a pair of single-ended pumpmotors mounted back-to-back with a common shaft and common housing, and with similar gears and rollers, except for face width which determines displacement per revolution in each case. If the displacement of one of the pump-motors is twice that of the other, then, by means of the pair of two-position valves $V_A$ and $V_B$, mechanical advantage of a pump and motor combination such as is shown, can be changed by proportions of 1:2:3.

The same effect is obtained by providing a dual displacement motor instead of a dual-displacement pump, in the circuits illustrated. Alternative possibilities are increased by providing dual displacement units in both pump and motor position, with the incorporation of additional valves. Although the shift mechanism illustrated in FIG. 23 provides discrete steps of mechanical advantage, it will be obvious to those skilled in the art that a suitably designed infinite proportioning valve would provide for continuous shift of mechanical advantage between the desired limits.

Coaster brake functions of a bicycle hydraulic transmission system may be accomplished by combining a pump and motor pair of fluid power converters of the present invention in a valved circuit now to be described. By reference to FIG. 22, it will be seen that the internal valve in both the pump and the motor elements enable non-rotational transfer of fluid when conditions are such as to cause the pressure difference from the high-pressure chamber (H) to the low pressure chamber (L) to be reversed. Therefore, the action of the bicycle transmission system incorporating such valve arrangement is a forward "free-wheeling" situation as in the case of a mechanical "coaster brake."

It is to be noted further that a single standard check valve installed to bridge the pump-motor connecting conduits as shown by the dotted line in FIG. 22 would provide the same "coaster-brake" forward-free wheel function, even when non-valve pump motors (such as that illustrated in FIGS. 3 and 8) are employed in the bicycle transmission system.

Figure 8:
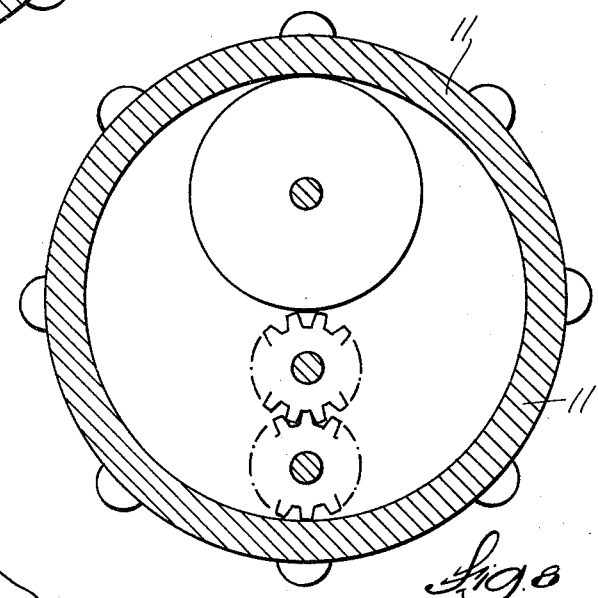
FIG. 8 is a view similar to FIG. 3, but wherein the housing has a smooth inner wall instead of an internal gear, and wherein the rotators include one smooth surface rotator and two gear-like rotators.
Figure 9:
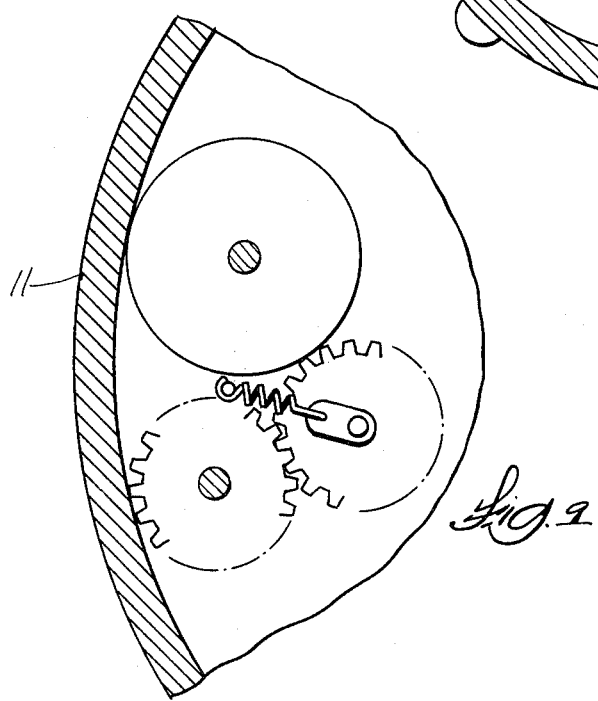
FIG. 9 is a view similar to FIG. 7 illustrating the structure of FIG. 8 wherein one of the gears operates as a pressure-release valve as well as an intermediate rotator.
Figure 24:
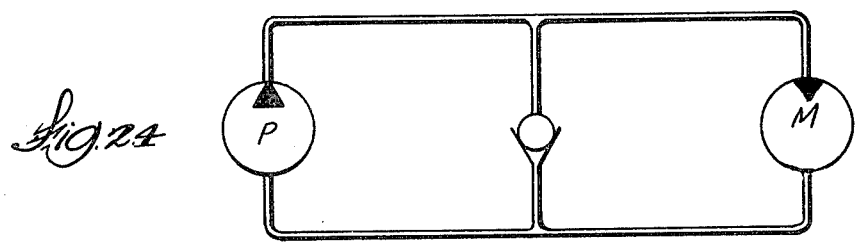
FIG. 24 is a schematic diagram illustrating the connection of a pair of pump-motors similar to that shown in FIGS. 3 and 8 (without release valves) arranged to provide a free-wheeling function in a bicycle transmission system.
Figure 25:
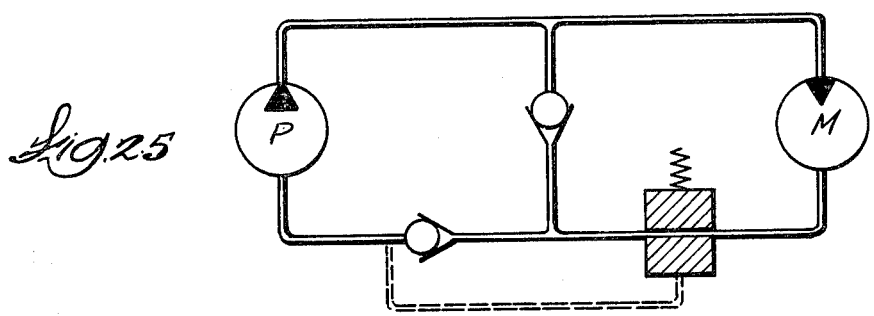
FIG. 25 is a schematic diagram, similar to FIG. 24, illustrating how a braking action can be obtained by insertion of additional valves.

Such arrangement is shown schematically in FIG. 24, and it will be noted that while coasting, if the pump crank is held stationary the hub motor becomes a pump which circulates fluid through itself via the bypass checkvalve. Also, note that if the bicycle is at a standstill and the pump is cranked in reverse direction, it will merely circulate fluid through itself via the bypass check valve. Pedal braking or stopping action can be obtained by insertion of two additional valves as is shown schematically in FIG. 25. It will be observed that reverse action of the pump crank now causes the brake check valve to close, thus directing reverse pump pressure to control the pilot-operated valve in the motor circulation circuit. As the motor flow is restricted, the forward free-wheel action is inhibited until, with complete flow stoppage, the motor is caused to be locked. Release of the reverse pump pressure by relief of the back pedal action frees the spring-return pilot operated valve, thus restoring normal forward drive with free-wheeling. The foregoing description assumes utilization of the pump-motor devices without internal self-valve features (such as illustrated in FIGS. 3 and 8) rather than that which is illustrated in FIGS. 7 and 9.

In FIG. 19, I have illustrated a pair of conduits at 84 and 85. These conduits are connected to the inlet and outlet portions respectively of one pump-motor mounted in the hub of the rear wheel and another in the pedal or crankshaft mechanism. When the operator of the bicycle cranks the pedals 57 and 58, the fluid is forced from the outlet 19 through one of the conduits, as, for instance, 84, and into the inlet port 18-a, of a unit such as shown in FIGS. 16 and 17, mounted as the hub of the wheel. The fluid then flows out an outlet (not shown) in the shaft 16 (similar to the port 18-a) and back through the conduit 85 to the inlet 18 of the unit mounted in the bicycle crank. It is to be understood that instead of the double-ended pump shown in FIG. 1, I may employ a pair of back-to-back, single-ended pumps as discussed with respect to FIGS. 18 and 23.

In the embodiments of the invention herein discussed, I have determined that to move a vehicle at five miles per hour I require a 24" wheel rotating at 70 rpm, and that practicable fluid flow in a motor for such 70 rmp operation is 1.35 gallons per minute, or 4.458 cu. in.-/rev. For such a construction, a pump-motor with 96 teeth (24 pitch) in the ring gear and 30 teeth in the pinion should be 3.585" wide. Assuming an additional $\frac{3}{4}$" of an inch housing at each end for shaft and housing support, this would produce a pump-motor about 5" wide. As such dimension is wider than desirable in a bicycle construction, I have found that a ring gear having 144 teeth (24 pitch) and a pinion of 18 teeth would provide a larger diameter but shorter cylinder of $3\frac{1}{2}$" overall width.

Additionally, by using 20 pitch gears with 120 teeth in the ring gear and 18 teeth in the pinion, I can reduce the width of the unit to $3\frac{1}{4}$", which is appropriate for bicycle construction.

Referring once again to the preferred embodiment which employs true rolling contact between gears and rollers, I draw attention to the configurations illustrated in FIG. 8 and FIG. 9. They represent embodiments complementary to FIG. 3 and FIG. 7 respectively in that components with toothed surfaces have been replaced by components with smooth surfaces, and components with smooth surfaces have been replaced by components with toothed surfaces. A spider-disc cage similar to that discussed previously now carries one roller and two equal radii pinions. The self-valving arrangement of FIG. 9 is similar to that of FIG. 7 except that the spring loaded pressure release element is a gear, the shaft tracks of which are arcs to ensure that it remains properly meshed by rolling on its matching gear to open a gap between itself and the roller for release of back-pressure.

Although it is mandatory that the two meshed gears be of the same pitch and equal in pitch diameter in order that the condition for true rolling contact will obtain (tooth tip peripheral velocities equal), the roller and smooth cylinder diameters are not critical as long as sealing contact is maintained. Circumferential speeds of elements in the surfaces of both the roller and the cylinder will match those of the gear tooth tips on which they also roll during rotation with sealing contact. The two displacement paths transfer fluid via intertooth spaces from one chamber to the other, both in the same direction with respect to the pair of chambers and both at the same rate since the transmit from chamber to chamber of pockets per rotation of each gear is the same.

The equal gears of FIG. 8 will present the same tooth phase relationships to their contacting surfaces whether the number of teeth is odd or even. The 180° offset of tooth phase at the smooth surfaces will mitigate "cogging" effects when the surfaces are resilient. Of great importance is the possibility of incorporating gear shaft bearing tracks in the end plates of the spider-disc cage so that the pair of meshed gears can shuttle back and forth along the axis shown as rotation sweeps the oppositely phased teeth across their respective surface engagements. Such facility will enable use of more coarsely pitched gears for greater displacement per rotation. Still further improvement may be realized by undulating the smooth surfaces with a shallow sinusoidal (trochoidal) wave with space period equal to the gear pitch. The tips only of the gear teeth can be shaped for minimum slide at the contact zones where fluid is moved from chamber to chamber through the still relatively deep intertooth pockets.

Such improvements in tooth-to-surface action can reduce cogging to such an extent that all components of the embodiment illustrated by FIG. 8 may be fabricated of metal. With such construction, the potential for wider application of this pump-motor invention is greatly enhanced. In particular, the shift from resilient to metallic seals in rolling contact makes the device capable of high-temperature operation, either as a pump (e.g. supercharger) or as a motor (e.g. turbine). The rotary engine portrayed in principle by FIG. 8 can be of turbine type in which one chamber is the high pressure input and the other chamber is the low-pressure exhaust. Among alternative driving means are high-pressure steam, air, or combustion vapors. Provision of suitable fuel injection and ignition means enable the device to operate as a continuous combustion rotary engine with rolling seals.

Figure 10:
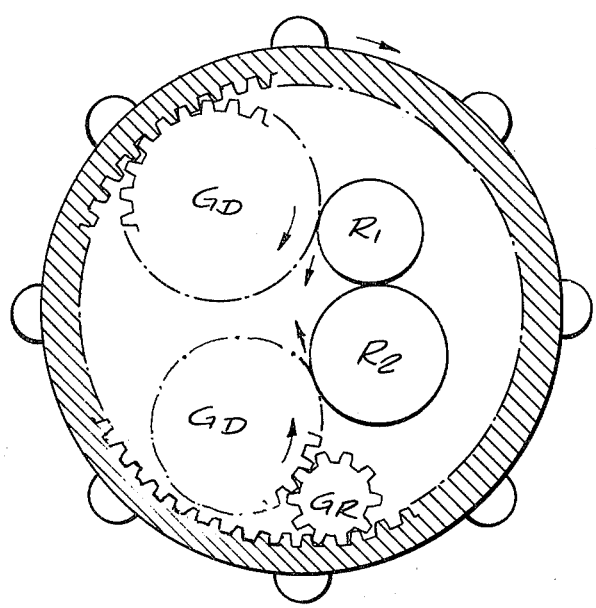
FIG. 10 illustrates another embodiment of the present invention, similar to FIGS. 2 and 3, illustrating how true rolling contact may be achieved among the rotating members.

FIG. 10 shows a means of modifying the pump-motor configuration of FIG. 2 and FIG. 3 in order to achieve analytically true rolling contact among the rotary members. The displacement gears $G_D$ meet the condition of equal pitch diameter which is necessary for equality of tooth tip peripheral velocities in the roller contact displacement zones. The reversing gear, $G_R$, transfers the desired pitch circle tangential velocity from the internal gear (which engages one of the displacement gears) to the second external displacement gear with rotational sense such that both displacement paths deliver fluid in the same direction with respect to the pair of chambers. Provided that the gears $G_D$ are the same, true rolling contact will be maintained among the members irrespective of the relative sizes of the internal gear, the reversing gear, and the two rollers $R_1$ and $R_2$.

Another embodiment (not shown) but similar to FIG. 10, is a smooth walled cylinder configuration with a pair of equidiameter gears substituted for the two rollers, and three rollers of arbitrary size substituted for the three pinions. The mutually engaged pair of rollers which takes the place of the $G_R$, $G_D$ mesh offers no particular advantage since they are not required to achieve true rolling contact. Deletion of that roller pair reduces the FIG. 10 complement to an embodiment like FIG. 8.

Figure 11:
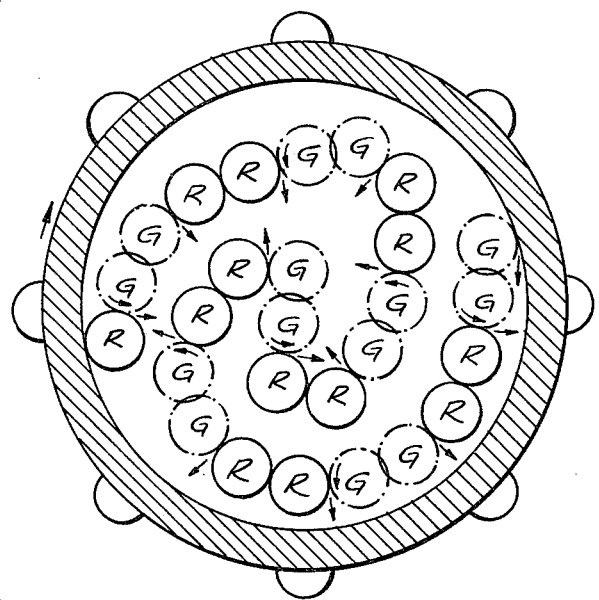
FIG. 11 illustrates how a multiplicity of matched pairs of rotators may be employed to provide a multiplicity of displacement paths.
Figure 26:
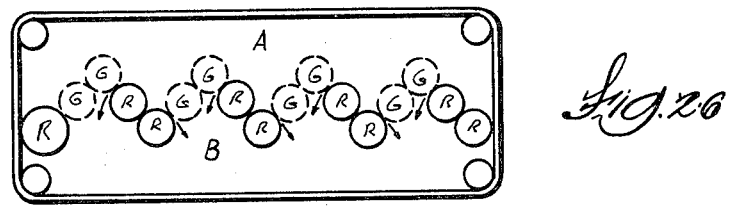
FIG. 26 illustrates another embodiment of the present invention, similar to that shown in FIG. 11, with a plurality of paired gears and paired rollers to provide a multiplicity of fluid-displacement paths, but wherein the external element is not a cylinder (as in FIG. 11) but is a continuous belt-like member.

Matched pairs of gears are alternated with matched pairs of rollers (not necessarily equi-sized) in the embodiment illustrated by FIG. 11. The alternating pairs, each member engaged with its neighbor, are shown arrayed along the arcs of a double involute spiral. That particular configuration is not essential for partioning the interior space of the cylinder into two chambers but is preferred for efficient packing of many displacement subsystems within the cylindrical housing. Examination of each displacement zone with respect to rotational sense under conditions of true rolling contact (as assured by equality of gears) shows that all displacement paths (there are 14 shown in the example) move fluid via intertooth pockets (displacement paths) in the same direction with respect to the pair of chambers. An embodiment similar to that shown in FIG. 11, is illustrated in FIG. 26, but in the FIG. 26 arrangement the cylindrical constraint of the housing is eliminated, and a belt-like envelope provided.

With a smooth-walled cylinder, the system illustrated by FIG. 11 is an extension of that shown in FIG. 8. Its complement, an extension of the system shown in FIG. 10, is realized by dropping out one roller and one gear from the left-hand end of the spiral arc and making the cylinder an internal gear meshed with both of the gears which remain as termini of the spiral arcs.

Because they afford true rolling contact of all rotating members, systems of the types illustrated by FIGS. 8, 9, 10 and 11 are preferred embodiments of the subject pump-motor invention.

Figure 12:
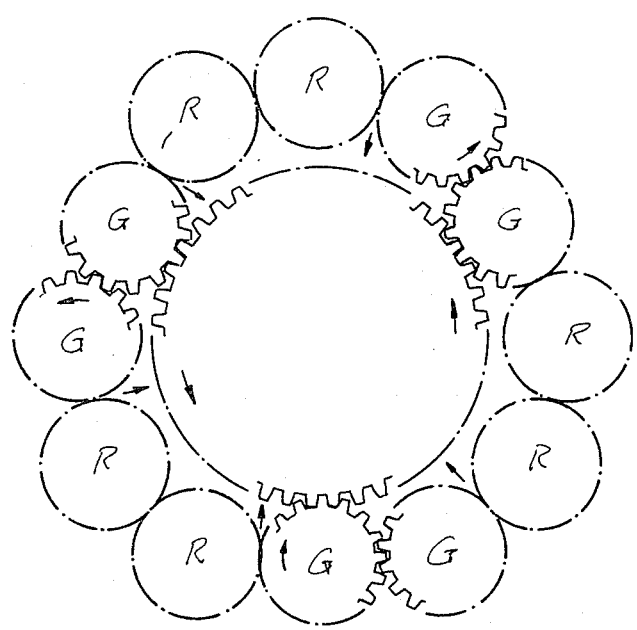
FIG. 12 illustrates another embodiment of the present invention wherein an external gear-surface rotator has disposed about its periphery a plurality of systems of the present invention.

A further extension of the concepts disclosed herein may be appreciated by reference to FIG. 12. In this version, paired identical gears alternate with roller pairs (not necessarily equi-sized). In this case, each member of the alternating pairs of members is engaged with its neighbor to form a complete circuit. For novelty, the array is shown encircling an external planetating system although such a circuitous arrangement could also be exhibited as an internal planetating system. An external system as shown in FIG. 12 has peculiar utility in several respects.

Consider that the circuit of the exterior rotary members forms the sealed wall of a cylindrical vessel and that, by construction similar to the spider-disc cage discussed previously, the cylinder ends are closed by plates in which the member shafts rotate and which serve as face bearings on which the gear and roller end faces slide. Consider further that an axial shaft passes through seals and radial bearings centered in the end plates and that fixed concentrically to that shaft is a thin sun gear engaging the three planet gears as shown at the center of FIG. 12. Let one or both end plates be fitted with access or egress ports of substantial cross section to which conduits may be attached. Notice that under conditions of relative rotation of sun and planets shown in FIG. 12 the multiple displacement paths between gears and rollers transport fluid from the exterior of the cylinder to its interior via the intertooth pockets (displacement paths). Reversal of rotational direction would cause fluid displacement in the reverse direction from interior to exterior through each of the displacement paths. Although the specific configuration illustrated provides three pairs of such paths, the number of pairs of paths can be increased or diminished by addition or deletion of paired roller and gear pairs to the cylinder wall with planet-sun engagement as shown.

From the foregoing presentation of operational modes and configurations, it follows that one application of such a device is its use as a submersible pump taking in fluid from the surround when the shaft is driven in one direction relative to the end plates and discharging fluid to the surround when driven in the opposite direction.

A second potential use is as a rotary steam or combustion engine of either internal or external type. External excess pressure discharged to the interior through the displacement paths and exhausted from the interior through the conduit would drive the shaft in one direction. Internal excess pressure exhausted to the exterior via the displacement paths would drive the shaft in the opposite direction.

Figure 13:
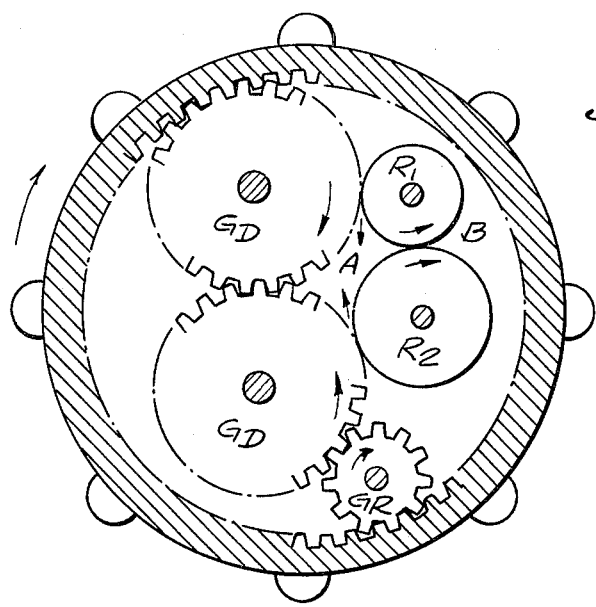
FIG. 13 illustrates another embodiment of the present invention, similar to the construction shown in FIG. 10, but wherein all of the gear-surface rotators are in mesh to provide zones of different pressure.
Figure 14:
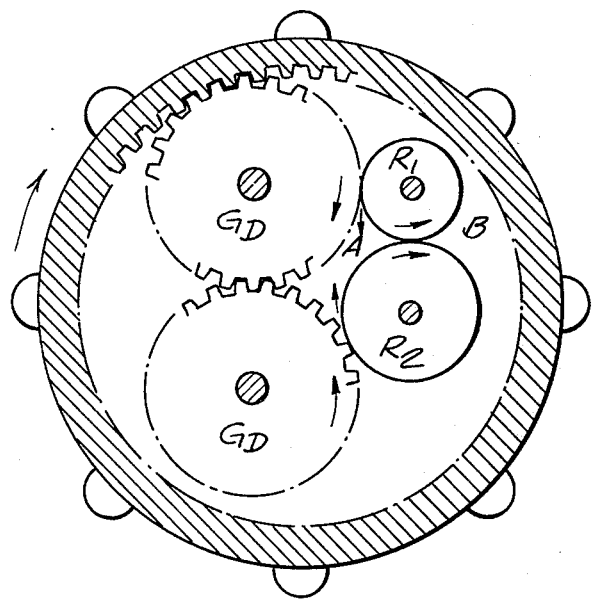
FIG. 14 illustrates an embodiment of the invention which is an extension of that shown in FIG. 13 but wherein one of the three gear-surface rotators is eliminated.
Figure 15:
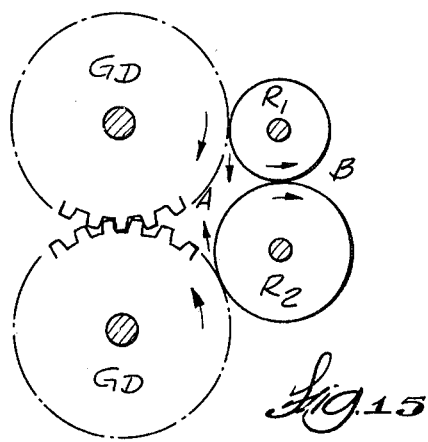
FIG. 15 illustrates that embodiment of the present invention, similar to FIG. 14, wherein the housing is eliminated and the functional rotators are reduced in number to an alternate pair.

Referring now to FIGS. 13, 14 and 15, one will note that when the equal pairs of gears $G_D$ form a proper mesh, although it may be possible to reposition the gear $G_R$ to continue its engagement with both the internal ring gear and the intermediate gear $G_D$ (as shown in FIG. 13), that gear $G_R$ can be dispensed with (as shown in FIG. 14) without detriment to the function of the system (used either as a pump or as a motor).

It will be observed that FIG. 14 is the "circuitous arrangement...exhibited as an internal planetating system" which was indicated as being related to the external system of FIG. 12 (but was not therein illustrated).

As stated above, the configuration of FIG. 12 can be diminished by deletion of paired roller and gear pairs until only one pair of displacement paths remains.

The essential minimal functional group of either the external planetating system reduced from the configuration of FIG. 12 or the internal planetating system shown in FIG. 14 is precisely that illustrated in FIG. 15.

Whether that functional group is driven by differential pressure between zone A and zone B or by a rotator (in either zone A or zone B), or, indeed, by no supplementary rotator at all, but rather by a shaft affixed to and on the axis of one of the four functional rotators, in no way changes the basic functional principle. Planetation is not absolutely requisite though it may be convenient.

It is to be understood that the present invention may be embodied in other specific forms without departing from the spirit or special attributes thereof, and it is, therefore, desirous that the present embodiment be considered in all respects as illustrative and not restrictive, references being made to Appended Claims rather than to the foregoing description to indicate the scope of the invention.

Having thus described my invention, what I claim as new and desire to protect by Letters Patent are the following:

1. In a fluid-power converter which is a pump-motor,
a housing,
a chamber in the housing,
a quantity of fluid in the chamber,
a plurality of rotators in the chamber,
said rotators being in contact whereby to define a plurality of areas in the chamber,
one of said areas being a high-pressure area,
one of said areas being a low-pressure area,
at least one of said rotators having a smooth surface,
at least one other of said rotators having a gear-like surface,
a smooth rotator and a gear-like rotator being in rolling contact with each other to define a displacement path therebetween whereby said fluid may be transferred from one area to another area,
at least one pair of similar rotators in contact with each other to provide a seal between them whereby to restrict to a displacement path any fluid flow between the said areas.

2. The fluid-power converter of claim 1 wherein the housing is a cylinder.

3. The fluid-power converter of claim 2 wherein the cylinder has a gear-like inner surface.

4. The fluid-power converter of claim 3 wherein the rotators include at least one gear-like pinion and at least two smooth-surface rollers, the gear-like pinion and one of the smooth-surface rollers being in contact with the inner surface of the cylinder and an intermediate smooth-surface roller being in contact with both the pinion and the first roller.

5. The fluid-power converter of claim 2 wherein the housing is a cylinder with a smooth inner surface.

6. The fluid-power converter of claim 5 wherein the rotators include at least one smooth and two gear-like rotators, the smooth rotator and one of the gear-like rotators being in contact with the inner surface of the cylinder, and an intermediate gear-like rotator being in contact with both of the other rotators.

7. The fluid-power converter of claim 4 wherein the intermediate rotator is offset from a line between the other two rotators and is biased toward the other two rotators to provide a valve between the said areas.

8. The fluid-power converter of claim 6 wherein the intermediate gear is offset from a line between the other two rotators and is biased toward the other two rotators to provide a valve between the said areas.

9. The fluid-power converter of claim 1 wherein the housing is a belt-like enclosure.

10. The fluid-power converter of claim 2 wherein a plurality of pairs of adjacent smooth rotators and a plurality of pairs of adjacent gear-like rotators are arranged in series-contact to provide an extended barrier between a high pressure area and a low pressure area, with a plurality of displacement paths between the high pressure area and the low pressure area.

11. The fluid-power converter of claim 9 wherein a plurality of pairs of adjacent smooth rotators and a plurality of pairs of adjacent gear-like rotators are arranged in series-contact to provide an extended barrier between a high-pressure area and a low-pressure area, with a plurality of displacement paths between the high-pressure area and the low-pressure area.

12. In a fluid-power-converting system for a bicycle, a pair of pump-motors as defined in claim 1, one of said pump-motors being affixed to the pedals of the bicycle and the other of the pump-motors being affixed to a wheel of a bicycle, fluid-connections between the two pump-motor units to provide a fluid-circulating system, a by-pass valve in the system to permit free-wheeling and coaster-brake operation of the bicycle.

13. The fluid-power converter of claim 1 wherein the fluid is a liquid.

14. The fluid-power converter of claim 1 wherein the fluid is a gas under compression.

15. A plurality of pairs of matched rotators, at least one pair of which has smooth surfaces, the rotators of said pair having parallel axes, and being in contact with each other, a seal formed between said rotators along the contact line, a second pair of matched rotators having gear-like surfaces, the rotators of said second pair having parallel axes and being in contact with each other, a seal formed between said second pair of rotators where the gear-like surfaces are in contact, a third pair of rotators, one of which has a smooth surface and the other of which has a gear-like surface, the rotators of said third pair having parallel axes and being in contact with each other, a displacement path formed between said third pair of rotators along the line of contact between the smooth surface and the gear-like surface, a fourth pair of rotators similar to the third pair of rotators, a second displacement path formed between the smooth surface of the rotator and the gear-like surface of the rotator, a chamber providing a pressure area and defined by the rotators, the pressure inside such chamber being different from the pressure outside of said rotators.

16. The fluid-power converter of claim 15 including a power input-output means operatively connected to one of said rotators.

17. The fluid-power converter of claim 15 and including a power input-output means operatively in contact with the periphery of one of said rotators.

18. In a fluid-power-converter system, a pair of pump-motors, one operating as a pump-unit, and the other operating as a motor-unit, a plurality of chambers in each of the motor-unit and the pump-unit, a plurality of rotators in each of the pump-unit and motor-unit, said rotators arranged so that adjacent rotators are in contact, interfaces created between adjacent rotators, at least one pair of adjacent rotators creating a fluid-seal at the interface therebetween, at least another pair of adjacent rotators creating a fluid-displacement path at the interface therebetween, the chambers in each unit being defined by the said rotators, fluid-connection between the pump-unit and the motor-unit, whereby operation of the pump-unit by an external force causes the fluid to circulate through the fluid-connection, the chambers, and through the fluid-displacement paths, whereby to drive the motor-unit.

19. The fluid-power converter of claim 18 wherein the pump-unit is affixed to the pedals of a bicycle, and the motor-unit as affixed to a wheel of the bicycle.

20. The fluid-power-converter system of claim 18 wherein each of the pump-unit and the motor-unit includes
a housing,
a chamber in the housing,
a quantity of fluid in the chamber,
a plurality of rotators in the chamber,
said rotators being in contact whereby to define a plurality of areas in the chamber,
one of said areas being a high-pressure area,
one of said areas being a low-pressure area,
at least one of said rotators having a smooth surface,
at least one other of said rotators having a gear-like surface,
a smooth rotator and a gear-like rotator being in rolling contact with each other to define a displacement path therebetween whereby said fluid may be transferred from one area to another area,
at least one pair of similar rotators in contact with each other to provide a seal between them whereby to restrict to a displacement path any fluid flow between the said areas.

* * * * *